United States Patent
Gulati et al.

(10) Patent No.: US 12,422,518 B2
(45) Date of Patent: Sep. 23, 2025

(54) INTERFERENCE RELOCATION IN RADAR APPLICATIONS TO MITIGATE INTER-RADAR INTERFERENCE

(71) Applicant: QUALCOMM Incorporated, San Diego, CA (US)

(72) Inventors: Kapil Gulati, Belle Mead, NJ (US); Dan Zhang, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 17/149,594

(22) Filed: Jan. 14, 2021

(65) Prior Publication Data

US 2022/0221553 A1     Jul. 14, 2022

(51) Int. Cl.

| | |
|---|---|
| *G01S 7/02* | (2006.01) |
| *G01S 7/35* | (2006.01) |
| *G01S 13/931* | (2020.01) |
| *H04W 74/0808* | (2024.01) |
| *G01S 7/00* | (2006.01) |
| *G01S 13/34* | (2006.01) |

(52) U.S. Cl.
CPC ............ *G01S 7/023* (2013.01); *G01S 7/35* (2013.01); *H04W 74/0808* (2013.01); *G01S 7/006* (2013.01); *G01S 7/021* (2013.01); *G01S 7/0235* (2021.05); *G01S 13/343* (2013.01); *G01S 13/931* (2013.01); *G01S 2013/9316* (2020.01); *G01S 2013/93271* (2020.01)

(58) Field of Classification Search
CPC .......... G01S 7/023; G01S 7/35; G01S 13/931; G01S 2013/9316; G01S 13/343; G01S 2013/93271; G01S 7/006; G01S 7/021; G01S 7/0235; H04W 74/0808
See application file for complete search history.

(56) References Cited

U.S. PATENT DOCUMENTS

| | | | |
|---|---|---|---|
| 2009/0146866 A1 | 6/2009 | Matsumoto et al. | |
| 2016/0349354 A1* | 12/2016 | Yomo | G01S 13/931 |
| 2017/0219689 A1 | 8/2017 | Hung et al. | |
| 2017/0363712 A1 | 12/2017 | Kim | |
| 2018/0220418 A1* | 8/2018 | Baghel | H04L 5/0053 |
| 2019/0064335 A1 | 2/2019 | Boutin et al. | |
| 2019/0137600 A1* | 5/2019 | Bilik | G01S 7/023 |
| 2019/0200389 A1* | 6/2019 | Li | H04B 7/0695 |
| 2019/0391247 A1* | 12/2019 | Gulati | G01S 13/341 |
| 2020/0007247 A1* | 1/2020 | Gulati | H04L 1/0003 |
| 2022/0026523 A1* | 1/2022 | Heiss | G01S 7/0234 |
| 2022/0039080 A1* | 2/2022 | Khoryaev | H04W 4/025 |
| 2022/0075021 A1* | 3/2022 | Åström | G01S 7/023 |

OTHER PUBLICATIONS

International Search Report and Written Opinion—PCT/US2021/060596—ISA/EPO—Feb. 25, 2022.

* cited by examiner

*Primary Examiner* — William Kelleher
*Assistant Examiner* — Ismaaeel A. Siddiquee
(74) *Attorney, Agent, or Firm* — Arun Swain

(57) ABSTRACT

Methods, apparatuses, and computer program products for radar devices are provided. A radar device may detect an interfering radar signal from a second radar device that interferes with measurement of a return of a radar signal from the first radar device. The radar device may perform a timing adjustment action in response to detecting the interfering radar signal from the second radar device.

27 Claims, 11 Drawing Sheets

INTERFERENCE RELOCATION IN RADAR APPLICATIONS TO MITIGATE INTER-RADAR INTERFERENCE

BACKGROUND

Technical Field

The present disclosure relates generally to radar devices, and more particularly, to radar devices that may communicate with other radar devices.

Introduction

For radar devices, such as frequency modulated continuous wave (FMCW) radar devices, multiple radar sources may lead to interference. Conventional radar waveforms, such as FMCW, may be indistinguishable from various source(s). Such limitations for radar devices may be problematic for various applications that rely on radar devices for safety features. For example, Modern motor vehicles are increasingly incorporating technology that helps drivers, such as lane departure warning (LDW), forward collision warning FCW, among other things. Such technologies may utilize radar devices. Moreover, radar devices are also important for facilitating automated driving systems (ADS). There exists a need for further improvements in radar technology to facilitate these applications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a first radar device are provided. The first radar device may detect an interfering radar signal from a second radar device that interferes with measurement of a return of a radar signal from the first radar device. The first radar device may perform a timing adjustment action in response to detecting the interfering radar signal from the second radar device.

In another aspect of the disclosure, a method, a computer-readable medium, and an apparatus of a first radar device are provided. The first radar device may receive a timing adjustment request from a second radar device. The first radar device may adjust a transmission timing of a radar signal in response to the timing adjustment request from the second radar device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
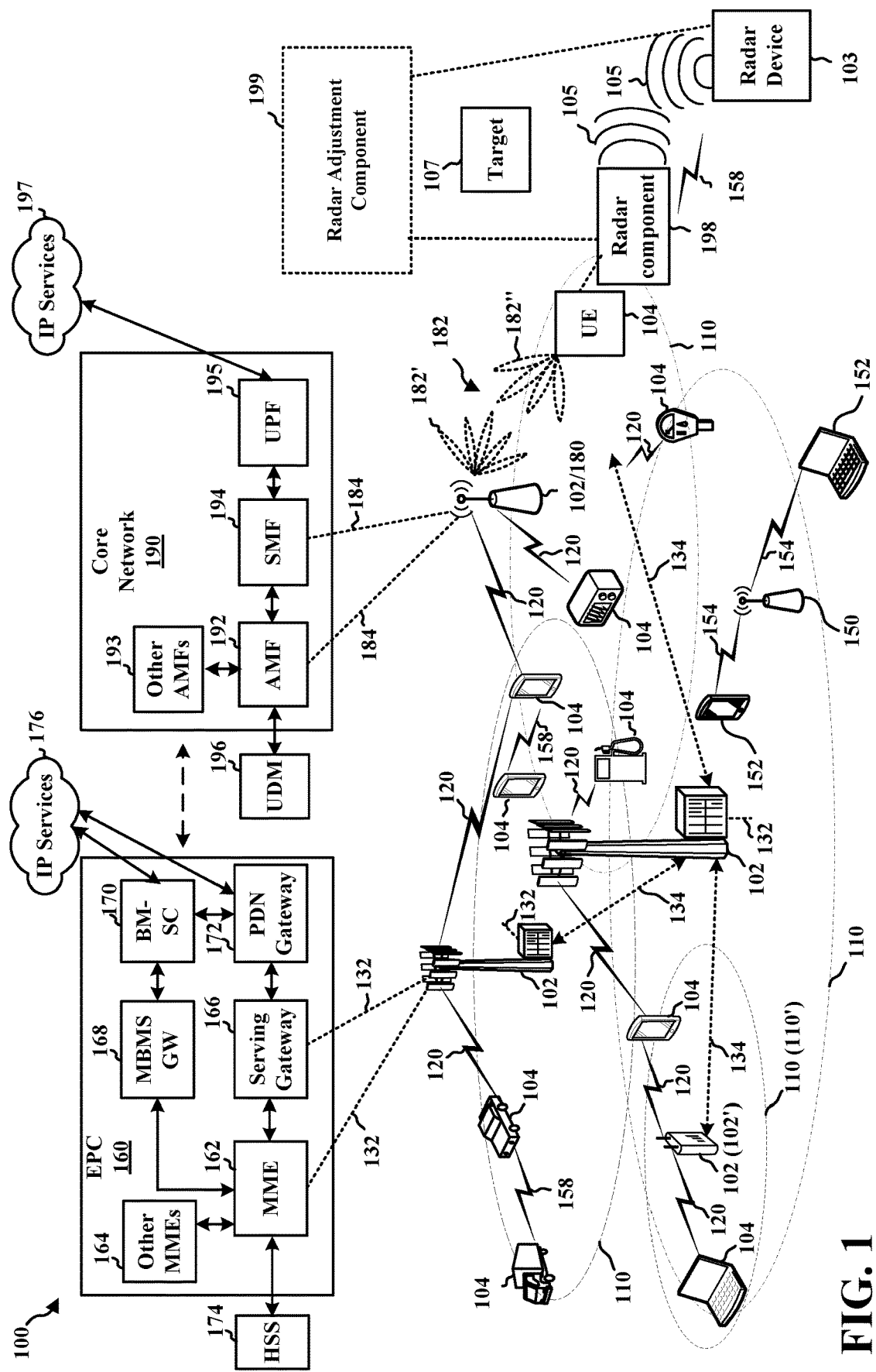
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A radar may be incorporated in equipment, such as a vehicle, for performing collision avoidance and other related techniques. Radar measurements may also be used for non-vehicular applications. The radar may be configured to transmit a radar signal/pulse and receive a return signal based on a reflection of the radar signal from an object. The radar device may determine the time delay between transmission of the radar signal and reception of the return signal in order to determine a distance between the radar and the object from which the return signal is reflected. Radar signal sensing may be employed for automotive radar, e.g., detecting an environment around a vehicle, nearby vehicles or items, detecting information for smart cruise control, collision avoidance, etc. Radar signal sensing may be employed for gesture recognition, e.g., a human activity recognition, a hand motion recognition, a facial expression recognition, a keystroke detection, sign language detection, etc. Radar signal sensing may be employed to acquire contextual information, e.g., location detection, tracking, determining directions, range estimation, etc. Radar signal sensing may be employed to image an environment, e.g., to provide a 3-dimensional (3D) map for virtual reality (VR) applications. Radar signal sensing may be employed to provide high resolution localization, e.g., for industrial Internet-of-things (IIoT) applications. In some examples, the radar device may provide consumer level radar with advanced detection capabilities. Radar signal sensing may provide touchless or device free interaction with a device or system. For example, a wireless device may detect user gestures to trigger an operation at the wireless device.

Radar transmissions from different radar devices (e.g., devices equipped with radars) may lead to inter-radar interference when the radar devices are transmitting signals simultaneously, partially overlapping in time, or close in time within a given area. Radar signals may be signatureless, and a radar device may not be able to distinguish between the reflections of its radar pulses and interferences or reflections of radar pulses that originate from other radar devices. Thus, when multiple radar devices are in proximity of each other, the radar transmissions from different radar devices may interfere with each other. The interference, the radar pulse from another device, and/or a reflected radar pulse from other radar devices may appear as a false target to a radar, causing the radar signal device to be unable to identify the target or to obtain correct information about the target.

Aspects presented herein enable a radar device to perform adjustments or to communicate with an interfering radar device in order to reduce interference between radar devices.

FIG. 1 is a diagram 100 illustrating an example of a wireless communications system and an access network in which base stations 102 or 180 may wirelessly communicate with user equipments (UEs) 104. Some wireless devices may perform radar signal sensing. For example, a radar device 103 may transmit a wireless signal 105 and use information about the signal to image an environment or determine information about a target 107 based on range, doppler, and/or angle information determined from the wireless signal. The signal may include a defined waveform, such as a frequency modulated continuous wave (FMCW) or a pulse or chirp waveform.

In some examples, a radar device 103, or a radar component 198, may transmit a radar signal 105 to determine information about a target or an environment. In some examples, a UE 104 may include a radar component 198 or may be associated with a radar component 198 (that may be incorporated in or in communication with the UE 104) configured to transmit a radar signal 105 and to perform measurements and/or detect targets 107 based on a return, or reflection, of the radar signal 105 from the target 107. The radar component 198 may be considered a radar device, or the UE 104 that comprises the radar component 198 may be considered a radar device. The UE 104 may be associated with and in communication with a radar module, such as an FMCW radar. In some aspects, the UE 104 may be a radar device that is mounted on a vehicle. The radar component 198 may include a radar adjustment component 199 that is configured to detect an interfering radar signal from a different radar device 103 that interferes with measurement of a return of a radar signal from the radar component 198 and to perform a timing adjustment action in response to detecting the interfering radar signal from the other radar device 103. In some aspects, the radar adjustment component 199 may be configured to adjust a timing of the radar signal 105 on a per chirp or per frame basis. In other aspects, the radar adjustment component 199 may be configured to transmit a request/indication to the other radar device 103 to adjust the timing of the interfering radar signal. In some aspects, the radar adjustment component 199 may be configured to receive a timing adjustment request from a second radar device and adjust a transmission timing of a radar signal 105 in response to the timing adjustment request from the second radar device. As illustrated, the radar device 103 may similarly include a radar adjustment component 199.

In some examples, radar devices 103, or a wireless device having a radar component 198, may exchange wireless communication. In some examples, the devices may exchange communication over a D2D link 158, such as based on sidelink.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
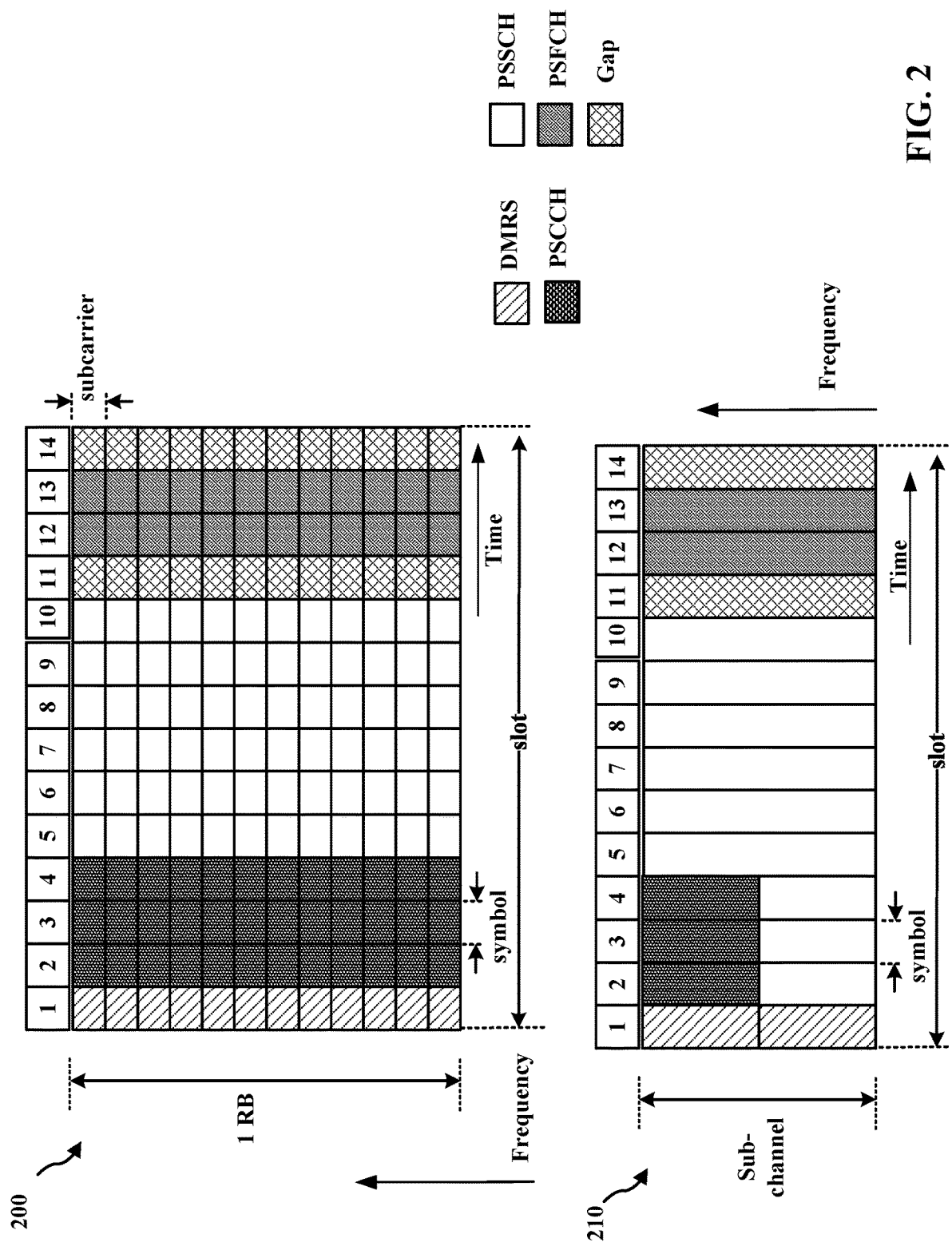
FIG. 2 illustrates an example slot structure for wireless communication.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
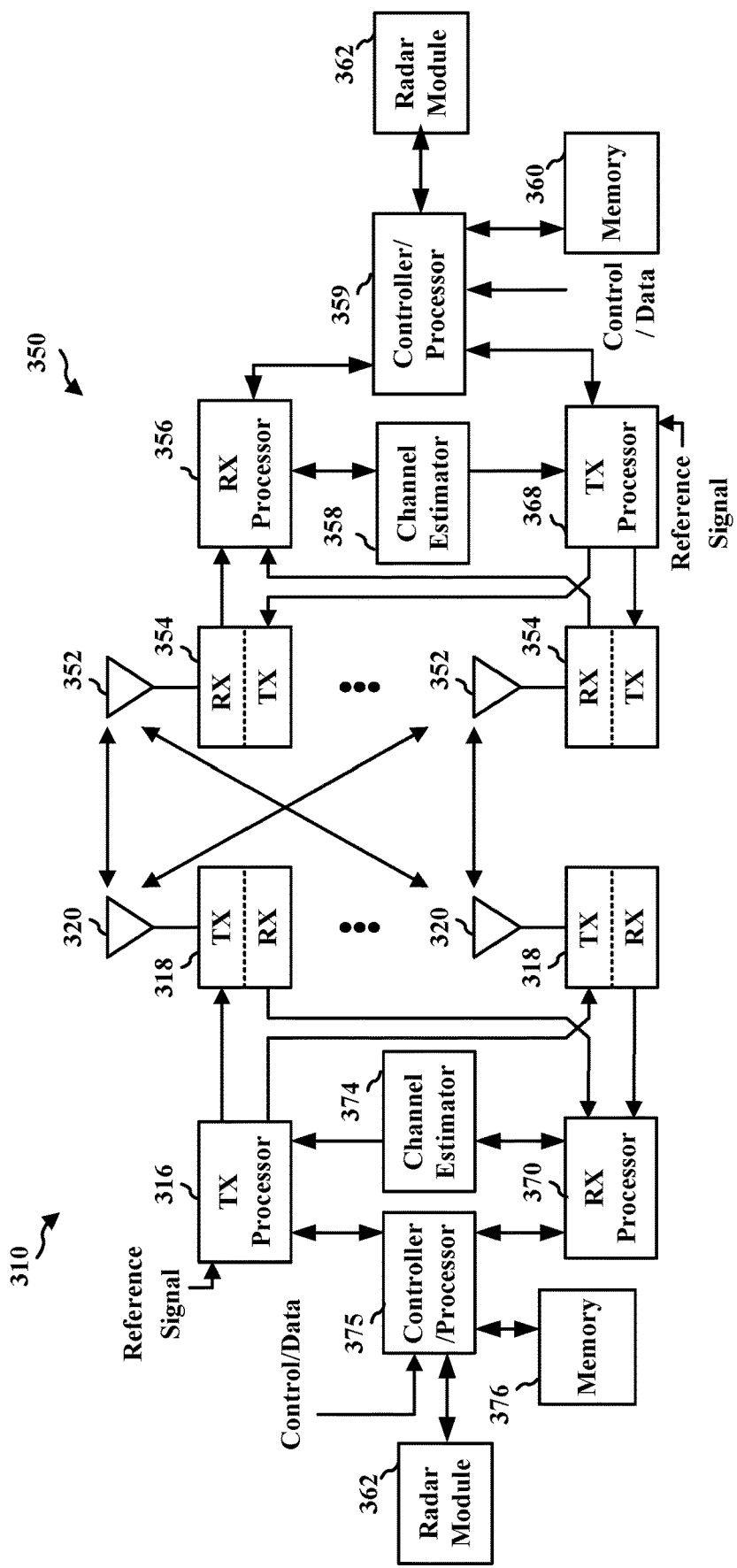
FIG. 3 is a diagram illustrating an example of a base station and user equipment (UE) in communication with a radar module in an access network.

FIG. 3 is a block diagram of a first wireless device 310 having components for wireless transmission. The wireless device 310 may be a radar device configured to perform the aspects presented herein. The term radar device may be used to refer to a device that has the capability to transmit and receive a radar signal in order to determine information about surrounding objects, the environment about the device, etc. In some examples, the wireless device 310 may have the capability to communicate with another wireless device 350, e.g., in addition to the radar transmission/reception, such as described in connection with FIG. 1. The wireless device 310 may include one or more antennas 320 may include a transmitter/receiver 318 with a corresponding transmit processor 316 and receive processor 370 that are configured to perform radar transmission and measurement, such as described in connection with FIG. 1. The one or more antenna 320, transmitter/receiver 318, transmit processor 316, and receive processor 370 may transmit a radar signal and receive reflections of the radar signal. The controller/processor 375 may determine radar information about a target based on the received signal.

In some examples, the wireless device 310 may be capable of wireless communication in addition to radar transmission/detection. Thus, FIG. 3 may also be a block diagram 300 of a first wireless device 310 in communication with a second wireless device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

The controller/processor 375 and/or 359 may be further in communication with and may control the operations of a radar module 362, which may also be referred to as a radar component, such as the radar component 198 in FIG. 1. The wireless devices 310 and 350 may be referred to as a radar device in some examples. In other examples, the radar module 362 may be referred to as a radar device.

At least one of the TX processor 368, the RX processor 356, the radar module 362, and the controller/processor 359 may be configured to perform aspects in connection with the radar adjustment component 199 of FIG. 1.

Figure 4:
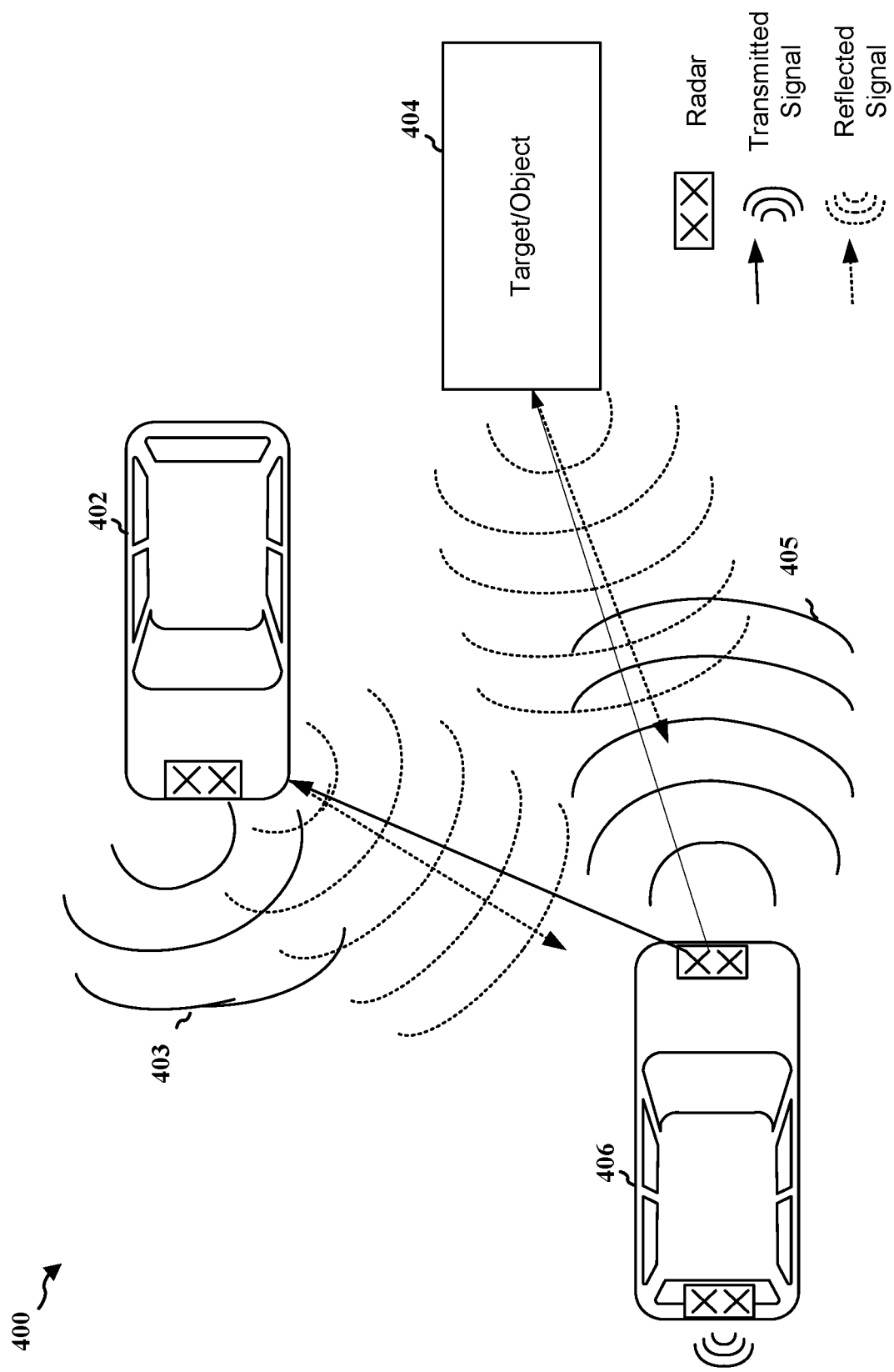
FIG. 4 illustrates example interference for radar devices.

FIG. 4 illustrates example diagram 400 showing interference between radar devices. FIG. 4 illustrates an example application of a radar component in a vehicle setting. Although the aspects are described for a radar component associated with a vehicle in order to explain the concept, the aspects may similarly be applied to a radar device that is not associated with a vehicle or that is applied on a non-vehicular setting. As shown by diagram 400 of FIG. 4, radar devices 402 and 406 may be associated with a vehicle for safety purposes (e.g., to avoid collisions), to monitor an environment, etc. One or more of the vehicles may transmit a radar signal and measure the reflected signal to detect a distance between other objects such as vehicles, pedestrians, road features, structures, etc. Although the actions are described as being performed by the vehicle, in some examples, the action may be performed by a radar device associated with a vehicle. Signals from different radar sources may lead to interference (e.g., inter-radar interference) e.g., if the radar signals are simultaneous, overlapping in time, or close in time. For example, the radar device 406 may transmit a radar signal 405, and may use the reflection to detect a target 404, other vehicles (e.g., radar device 402), the surrounding environment, etc. The radar device 402 may similarly transmit a radar signal 403. The radar component of radar device 406 may receive the radar signal 403 as interference to the reflection of its own radar signal 405. For example, as the radar signal (e.g., waveform) transmitted by radar devices 402 or 406 may be signatureless, the radar device 406 may not be able to distinguish between reflected radar pulses of its own radar signal 405 and other radar signals from other radar devices, such as the radar signal 403 or a reflection of the radar signal 403 from another radar device. In other words, radar waveforms, such as the frequency modulated continuous wave (FMCW), may be indistinguishable to a radar when they are coming from various sources. Thus, when more radar devices are in proximity with each other, they may start to interfere each other. The interference or the reflected radar pulse from other radar(s) may appear as a false target to a radar, or they may cause the radar to obtain incorrect information about the target (e.g., inaccurate distance, time offset, transmission power, etc.). Multiple radar sources may lead to significant interference. The radar signals from each radar device that may be high power may appear as a false target at a distance (e.g., half distance with a timing offset) with high power for the other radar device.

Figure 5:
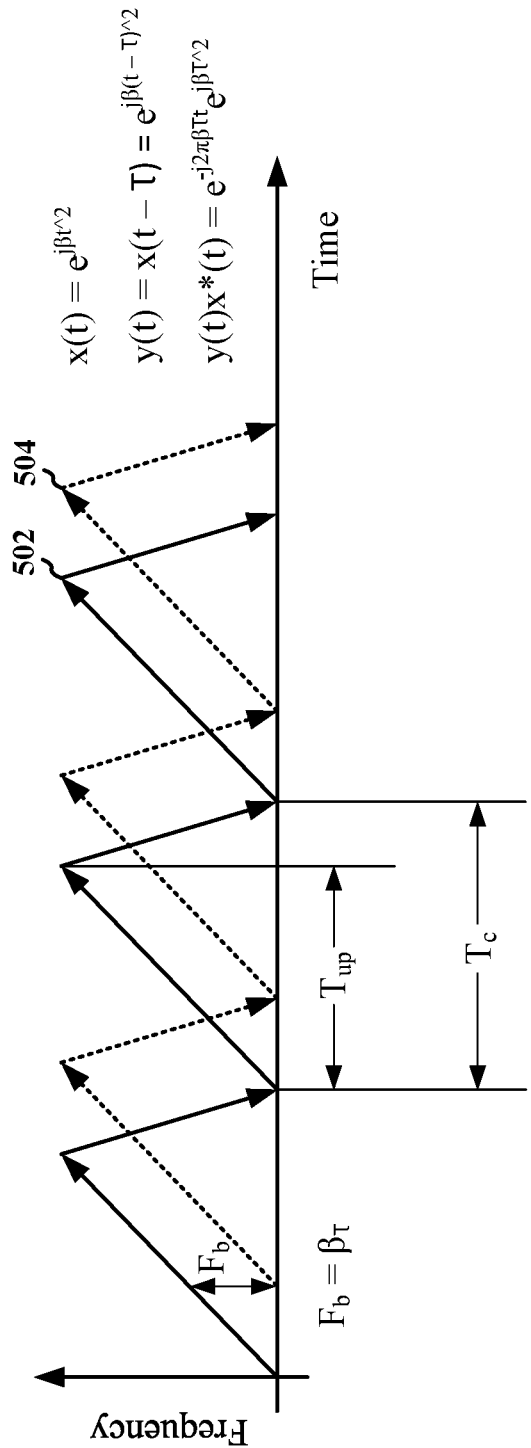
FIG. 5 illustrates an example FMCW.

FIG. 5 illustrates example FMCW diagram 500 that illustrates a waveform for a radar signal 502 and a return signal 504, e.g., a reflection of the radar signal 502. As illustrated in FIG. 5, an FMCW radar may transmit chirps sweeping in frequency and receive the same chirps after delay (after reflection). The signals 502 and 504 may be associated with an FMCW waveform utilized by the radar for frequency sweeping. The radar device may detect a target object by transmitting a chirp signal (which may also be referred to as a pulse signal), where the chirp signal may have a frequency that varies linearly (e.g., frequency sweeping) over a fixed period of time (e.g., sweep time) by a modulating signal. For example, as shown by diagram 500, a transmitted chirp may have a starting frequency. Then the frequency is gradually (e.g., linearly) increased on a sinusoid until it reaches an upper frequency of the sinusoid, and then the frequency of the signal returns to the starting frequency and another chirp may be transmitted in the same way. In other words, each chirp (or radar pulse) may include an increase in the frequency (e.g., linearly) and a drop in the frequency, such that the radar device may transmit chirps sweeping in frequency. The radar signal 502 may correspond to an instantaneous frequency that increases from zero to a higher frequency and subsequently decreases from the higher frequency to zero based on a sinusoidal operation. Each sweep up and down may correspond to an individual pulse or chirp of the FMCW. A chirp time may be indicated by $T_c$ and a sweeping up time may be indicated by $T_{up}$. For instance, the frequency may sweep up from 77 GHz to 78 GHz to provide a sweeping bandwidth of 1 GHz. A time period that elapses for the sweeping up of the 1 GHz of bandwidth may correspond to $Tu_p$. After the radar sweeps up to 78 GHz, an additional/non-zero length of time may elapse for the radar to sweep down and return to 77 GHz. The additional/non-zero length of time may correspond to $T_{down}$. Thus, $T_{up}+T_{down}$ may equal $T_c$ (e.g., the duration of the chirp/pulse). In examples, the radar may be configured based on certain $T_c$ parameters.

The radar may receive a series of chirps via the return signal 504 that match the transmitted signal 502, albeit delayed based on a location of an object from which the return signal is reflected. As a distance between the radar and the object increases, the corresponding delay may become larger. The distance to the object may be determined based on determining the delay. For example, rather than directly measuring a time of the delay, a frequency delta between the transmitted signal 502 and the return signal 504 may be determined, where the frequency delta may be proportional to the delay. The range of the object may be further determined based on the delay being proportional to the range. The frequency delta may be associated with a range spectrum and a beat frequency ($F_b$) determined based on a Fast Fourier Transform (FFT). The beat frequency may correspond to a mixed output of the transmitted signal 502 and the return signal 504. A slope for sweeping up the frequency may be defined (e.g., 1 GHz per $T_{up}$ seconds), such that a rate at which the slope changes may correspond to a beta ($\beta$) parameter.

The parameters of the transmitted signal 502 and the return signal 504 may be indicative of a maximum (e.g., theoretical) detectable range of an FMCW receiver of the radar. For longer range radars, 100-300 m may be the maximum detectable range. The parameters may also be indicative of a maximum detectable speed/velocity (e.g., 30-40 m/s). For example, based on multiple received chirps, the velocity of the object may be determined based on a Doppler spectrum and a direction of the object may be determined based on a direction of arrival (DoA) spectrum. In examples, outputs such as $x(t)=e^{j\beta t^{\wedge}2}$; $y(t)=x(t-\tau)=e^{j\beta(t-\tau)^{\wedge}2}$; and/or $y(t)x^*(t)=e^{-j2\pi\beta\tau t}e^{j\beta\tau^{\wedge}2}$ may be determined based on the parameters of the FMCW waveform, where x corresponds to a transmitted chirp signal, y corresponds to a received chirp signal, t corresponds to time, j corresponds to $\sqrt{-1}$, and τ corresponds to a delay between a transmitted chirp and a received chirp. That is, three different frequency analyses may be performed to determine range, velocity, and/or direction. There may be a delay proportional to range. There may be mixer output beat frequency. An FMCW receiver (e.g., incorporated in a radar) may operate in a range spectrum and may identify beat frequency/range. With multiple chirps, the FMCW receiver may identify target velocity based on Doppler spectrum and may identify target direction based on the direction of arrival (DoA) spectrum.

Figures 6A, 6B:
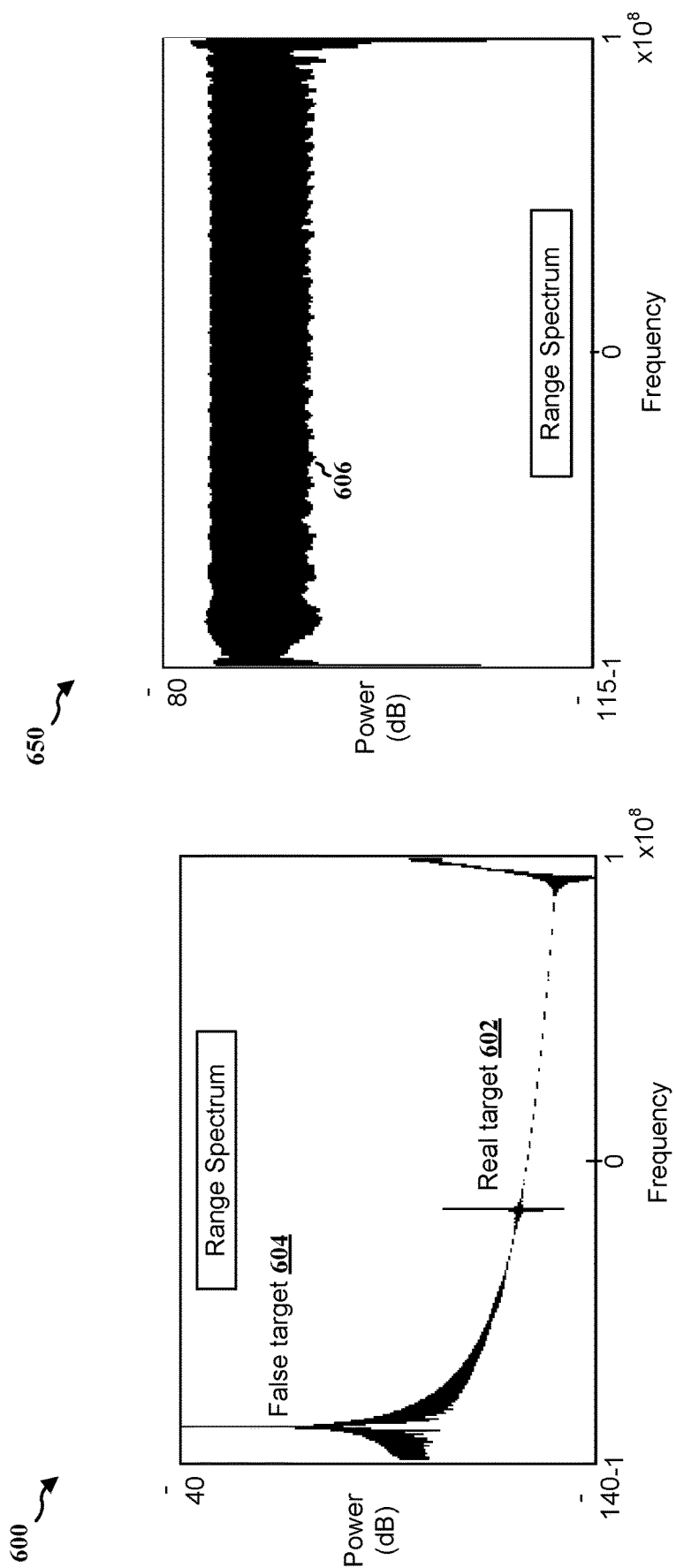
FIGS. 6A and 6B illustrate an example of interference causing a ghost target.

FIGS. 6A and 6B illustrate examples 600 and 650 illustrating an interference that is causing a ghost target. As shown by example 600, when a radar performs the frequency sweeping (e.g., transmitting chirps) on a target, the target may appear as a peak 602 on a range spectrum. However, if there is another radar (e.g., an interferer) that sweeps the frequency in the same direction, an interference may show up on the range spectrum as a ghost target/false peak 604 on a range spectrum. Thus, the radar device may incorrectly identify the false target as the target. In another example, as shown by diagram 650, if the radar device and the interferer sweep frequency in an opposite direction (e.g., the interferer uses a different chirp that sweeps down the frequency from high to low), the interference from the interferer may show up as a wideband noise 606 on the range spectrum. Regardless whether the interference shows up as a false target/peak 604 or the wideband noise 606, the interference may cause the radar device unable to identify the target.

Figure 7A:
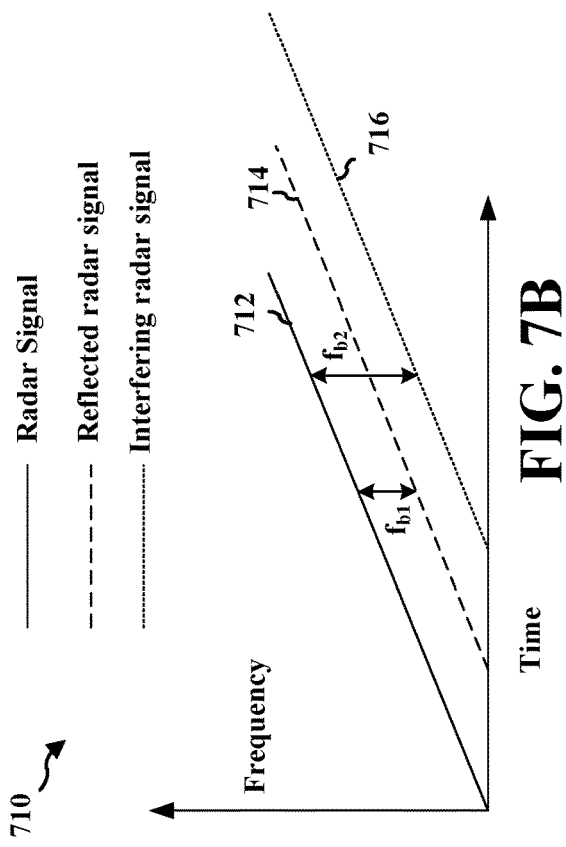
FIGS. 7A-7D illustrate examples of radar operations in accordance with various aspects of the present disclosure.
Figure 7B:
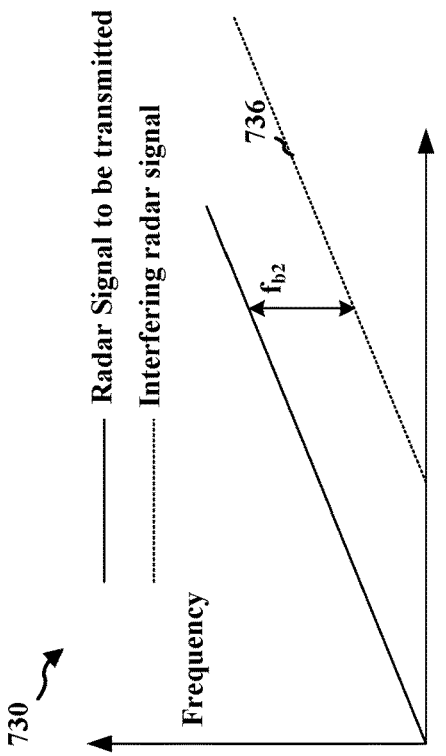

Aspects presented herein enable a radar device to address potential interference from another radar signal by performing a timing adjustment action. FIGS. 7A-7D illustrate examples of radar operations 700, 710, 720, and 730 in accordance with various aspects of the present disclosure. As illustrated in FIG. 7A, a radar signal 702 may reflect from a target and be received by the transmitting radar device as the radar return 706. FIG. 7A illustrates an example in which the radar return 706 is in proximity with an interference 704, such as a radar signal from another radar device. For example, the radar return 706 may generate beat frequency $f_{b1}$ that is too close to interference 704 generating beat frequency $f_{b2}$, e.g., within a threshold amount of time. The radar return can be masked by the interference. In order to avoid the problems caused by interference 704, the radar device may adjust its transmission timing on a per-chirp or a per-frame basis. In some examples, the radar device may randomly adjust the transmission timing of the radar on a per chirp basis. In other examples, the radar device may randomly adjust the transmission timing of the radar on a per frame basis. For example, the radar device may apply a timing adjustment that changes the timing of the transmission signal by a random amount of time, e.g., rather than by a fixed amount of time. In some aspects, a per-chirp timing change may result in faster adaptation than a per-frame timing change. In some aspects, the amount of random timing change may be selected to be large enough to unmask a true radar return signal (e.g., for the radar device to distinguish the radar return of its own radar signal in contrast to the interfering radar signal) according to a threshold probability level. FIG. 7B illustrates an example showing a timing adjustment of the radar signal from FIG. 7A relative to the interfering radar signal. As shown in FIG. 7B, after the timing adjustment, at the next chirp or frame, the radar (and/or the interferer) may change its radar transmission timing (e.g., voluntarily without further instructions) with a high probability of changing the frequency difference between the radar signal and the interfering signal, e.g., $f_{b2}$, to an amount or location that does not interfere with reception of the radar return. The timing adjustment may be selected to help the beat frequency $f_{b2}$ to deviate from the beat frequency $f_{b1}$ with a higher probability, e.g., to increase the likelihood that the radar device will be able to accurately receive the radar return signal to detect targets. The timing adjustments helps the radar device's operation (e.g., the radar signal 712 and the radar return 716) to be less affected by the relocated interference 714 (e.g., that is relocated relative to the radar signal and/or return signal). In the example in FIG. 7B, the interference may be relocated relative to the radar signal and/or return signal by adjusting the timing of the radar signal, for example.

In some aspects, when a radar senses an interfering radar signal from another radar device (e.g., an interfering radar device) that masks a target being tracked, e.g., as described in connection with any of FIGS. 4, 6A, or 6B, the radar may inform/request the interfering radar device to change timing to relocate the interference. In some aspects, if a position of the interfering radar device is identifiable (e.g., through sidelink communication, such as V2X positioning, or through global positioning system GPS/Global Navigation Satellite System GNSS), the communication between the radar devices may be done through radar communication. In some aspects, if the interfering radar device is identifiable, the communication between the radar devices may be done through unicasting. For example, the radar device may unicast a request or indication to the interfering radar device to change its radar transmission timing. In some examples, the radar device may send the request or indication may be sent as a sidelink message to the interfering radar device. For example, in FIG. 4, the radar device 406 may transmit a request to the radar device 402 to adjust the transmission timing of the radar signal 403. In other examples, the radar device may transmit the request or indication as a multicast message or a broadcast message. In such aspects, the interfering radar device may respond to the indication or the request by changing the timing of the interference 714 based on the request by the radar. Therefore, the interference 714 is relocated relative to the radar signal based on the coordination of the radar device and the interfering radar device.

Figure 7C:
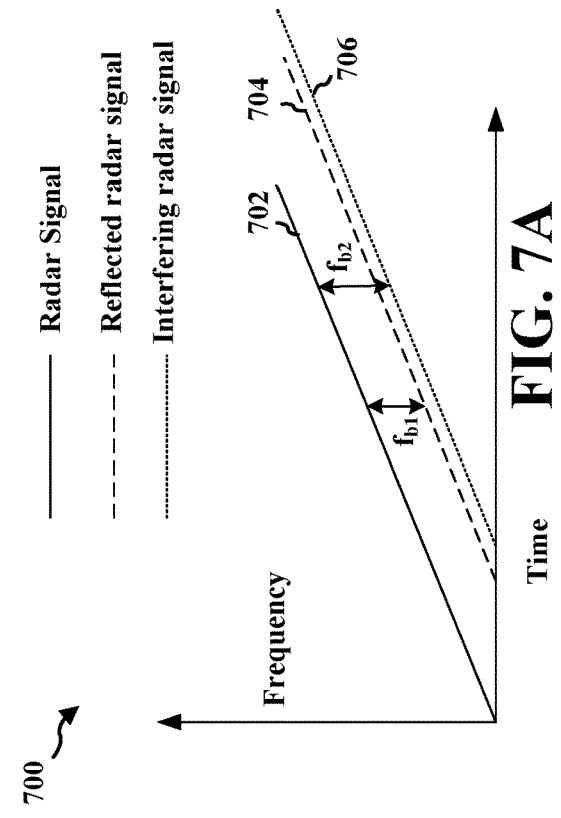
Figure 7D:
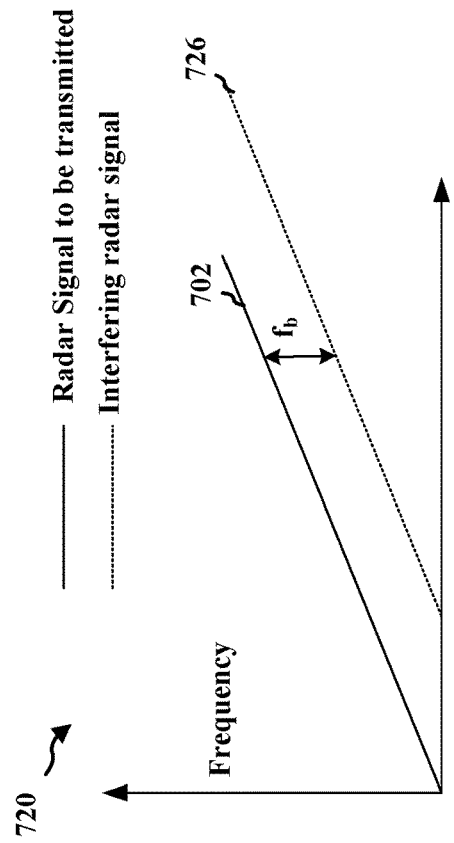

In some aspects, the radar device may perform a sensing procedure, such as a listen before talk (LBT) procedure, before transmitting a radar signal. LBT is merely one example, and the radar device may perform other sensing procedures in which the radar device monitors for other radar signals that may potentially cause interference to radar measurements of the radar device. For example, the radar may perform LBT before a radar transmission, periodically during radar operation, or when it senses potential interference (e.g., after losing tracked target or sensing elevated interference energy). The radar device may determine a beat frequency $f_b$ between a radar signal that the radar will transmit and a radar signal of an interfering radar device, e.g., in order to identify potential interferers. During the LBT procedure, the radar may identify interferers that are detected as ghost targets, e.g., such as described in connection with any of FIGS. 4, 6A, or 6B. The radar may then unicast, broadcast, or multicast a request for the interfering radar device to change timing of a radar signal to relocate interference relative to a signal of the radar device. For example, as illustrated in FIGS. 7C and 7D after detecting potential interference 726, the radar may then unicast, broadcast, or multicast a request to change timing to relocate interference to the inteferer(s). The interfering radar device may adjust the timing of its interfering radar transmission, and the interference 736 may be relocated relative to the radar signal of the radar device. As the radar is performing LBT, there may be no actual radar return that is affected by the interference 726, e.g., in some examples, the radar device may determine potential interfering radar signals before experiencing the interference to its own radar return signal. The radar device may perform an action, whether adjusting its own radar transmission timing or requesting the interfering radar device to adjust the timing of the potentially interfering radar signal, in order to address the potential interference before transmitting its own radar signal and receiving a radar return signal.

Figure 8:
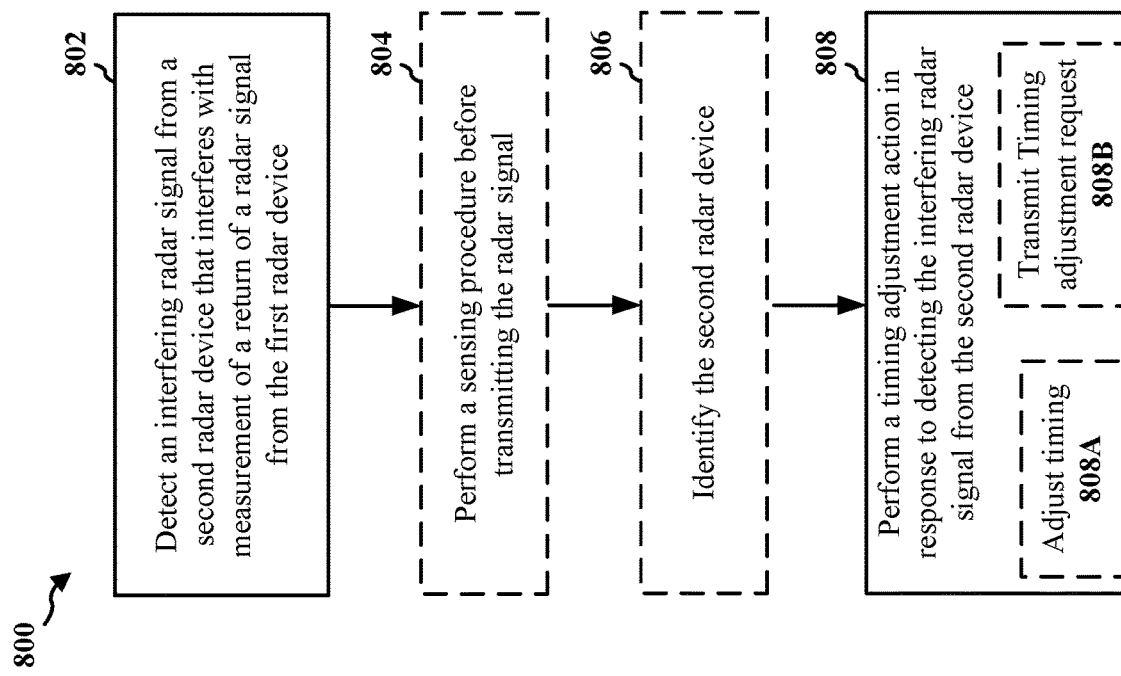
FIG. 8 is a flowchart of a method of radar operation in accordance with various aspects of the present disclosure.

FIG. 8 is a flowchart 800 of a method of radar operation. The method may be performed by a first radar device (e.g., the UE 104 comprising a radar module or a radar component 198; a radar device 103, 406; a wireless device 310, 350; a radar module 362; the apparatus 1002). Optional aspects are illustrated with a dashed line. The method may enable a radar device to reduce interference caused by an interfering radar signal from another radar device in order to more accurate perform radar detection.

At 802, the first radar device may detect an interfering radar signal from a second radar device that interferes with measurement of a return of a radar signal from the first radar device. The detection 802 may be performed by an interference detection component 1042 in FIG. 10. For example, FIGS. 4, 6A, 6B, 7A, 7B, 7C, and 7D illustrate example aspects of an interfering radar signal. Based on the interfering radar signal, the first radar device may perform a timing adjustment action in response to detecting the interfering radar signal from the second radar device as described in connection with 808. In some aspects, the radar signal comprises a FMCW, e.g., such as described in connection with FIG. 5. In some aspects detecting the interfering radar signal comprises detecting that the return of the radar signal is masked by the interfering radar signal from the second radar device.

In some aspects, at 804, the first radar device may perform a sensing procedure before transmitting the radar signal, wherein the first radar device detects the interfering radar signal from the second radar device based on the sensing procedure. Example aspects are of sensing procedure are described in connection with FIGS. 7C and 7D. The sensing 804 may be performed by a sensing component 1044 in FIG. 10. In some aspects, the sensing procedure comprises an LBT procedure. In such aspects, detecting the interfering radar signal from the second radar device may include processing, during the sensing procedure, a detected signal from the second radar device to obtain a measurement; determining that the measurement satisfies a threshold; and identifying a result of the sensing procedure based at least in part on the measurement satisfying the threshold. In some aspects, if the measurement is less than the threshold, the result of the sensing procedure comprises a successful result and the first radar device transmits the radar signal without the timing adjustment action. In some aspects, if the measurement is greater than or equal to the threshold, the result of the sensing procedure comprises a failed result that triggers the first radar device to perform the timing adjustment action.

At 806, the first radar device may identify the second radar device, e.g., in order to transmit a unicast message to the second radar device. In some examples, the first radar device may identify the second radar device based on sidelink communication, e.g., such as a sidelink message received from the second radar device. The message may include an identifier or other information that enables the first radar device to identify the second radar device and to transmit communication that is directed to the second radar device, e.g., as a unicast transmission to the second radar device. In some aspects, the second radar device may be identifiable based on the interfering signal. In some aspects, the first radar device may identify a location of the second radar device based on sidelink positioning, such as V2X positioning. The sidelink positioning may include the reception of a sidelink positioning message from the second radar device. In other examples, the first radar device may identify the second radar device based on GPS/GNSS. The identification 806 may be performed by an identify component 1046 in FIG. 10.

At 808, the first radar device may perform a timing adjustment action in response to detecting the interfering radar signal from the second radar device. The performance 808 may be performed by a timing adjustment action component 1048 in FIG. 10. In some aspects, the timing adjustment action includes adjusting timing of the first radar device's radar signal, at 808A. For example, in some aspects, the timing adjustment action comprises adjusting a transmission timing of the radar signal from the first radar device. In some aspects, the first radar device adjusts the transmission timing of the radar signal comprises on a per-chirp basis. In some aspects, the first radar device adjusts the transmission timing of the radar signal by a random amount of time at each chirp. In some aspects, the first radar device adjusts the transmission timing of the radar signal on a per-frame basis. In some aspects, the first radar device adjusts the transmission timing of the radar signal by a random amount of time at each frame. In some aspects, the timing adjustment action includes transmitting a timing adjustment request to the second radar device at 808B. In some aspects, if the first radar device can identify the second radar device at 806, the first radar device unicasts the timing adjustment request to the second radar device. In some aspects, if the first radar device can identify a location of the second radar device at 808B, the first radar device may transmit the timing adjustment request to the second radar device based on radar communication that may be based on the location. In some aspects, the first radar device broadcasts or multicasts the timing adjustment request (e.g., if the first radar device cannot identify the second radar device at 806). In some examples, the first radar device may transmit a sidelink transmission with the timing adjustment request. A different term or description may be used than "timing adjustment request," e.g., the first radar device may provide any indication that indicates for the second radar device to adjust a timing of an interfering radar signal.

Figure 9:
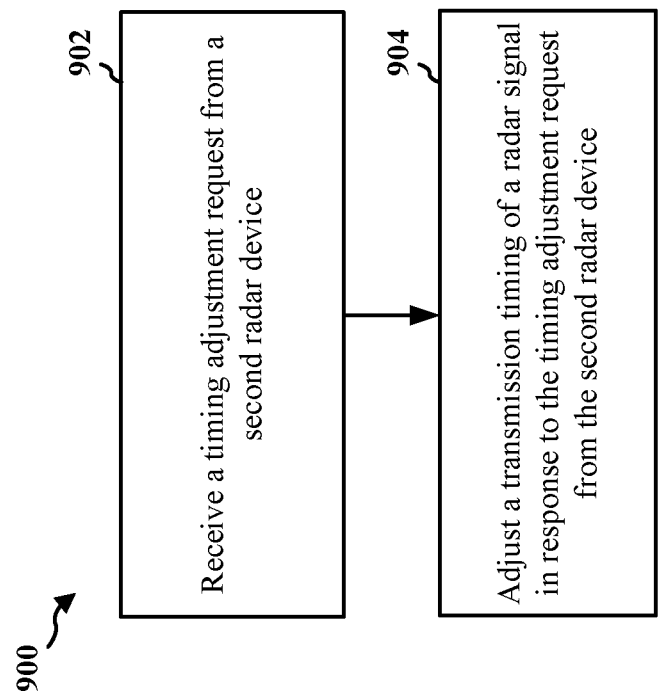
FIG. 9 is a flowchart of a method of radar operation in accordance with various aspects of the present disclosure.

FIG. 9 is a flowchart 900 of a method of radar operation. The method may be performed by a first radar device (e.g., the UE 104 comprising a radar module or a radar component 198; a radar device 103, 402; a wireless device 310, 350; a radar module 362; the apparatus 1102).

At 902, the first radar device may receive a timing adjustment request from a second radar device. The reception 902 may be performed by a timing adjustment request reception component 1142 in FIG. 11. In some aspects, the timing adjustment request is received via unicast. In some aspects, the timing adjustment request is received via broadcast. In some aspects, the timing adjustment request is received via multicast. In some examples, the first radar device may receive a sidelink transmission from the second radar device with the timing adjustment request. A different term or description may be used than "timing adjustment request," e.g., the second radar device may provide any indication that indicates for the first radar device to adjust a timing of an interfering radar signal.

At 904, the first radar device may adjust a transmission timing of a radar signal in response to the timing adjustment request from the second radar device. The adjustment may be performed by a timing adjustment component 1144 in FIG. 11. In some aspects, the first radar device adjusts the transmission timing of the radar signal comprises on a per-chirp basis. In some aspects, the first radar device adjusts the transmission timing of the radar signal by a random amount of time at each chirp. In some aspects, the first radar device adjusts the transmission timing of the radar signal on a per-frame basis. In some aspects, the first radar device adjusts the transmission timing of the radar signal by a random amount of time at each frame.

Figure 10:
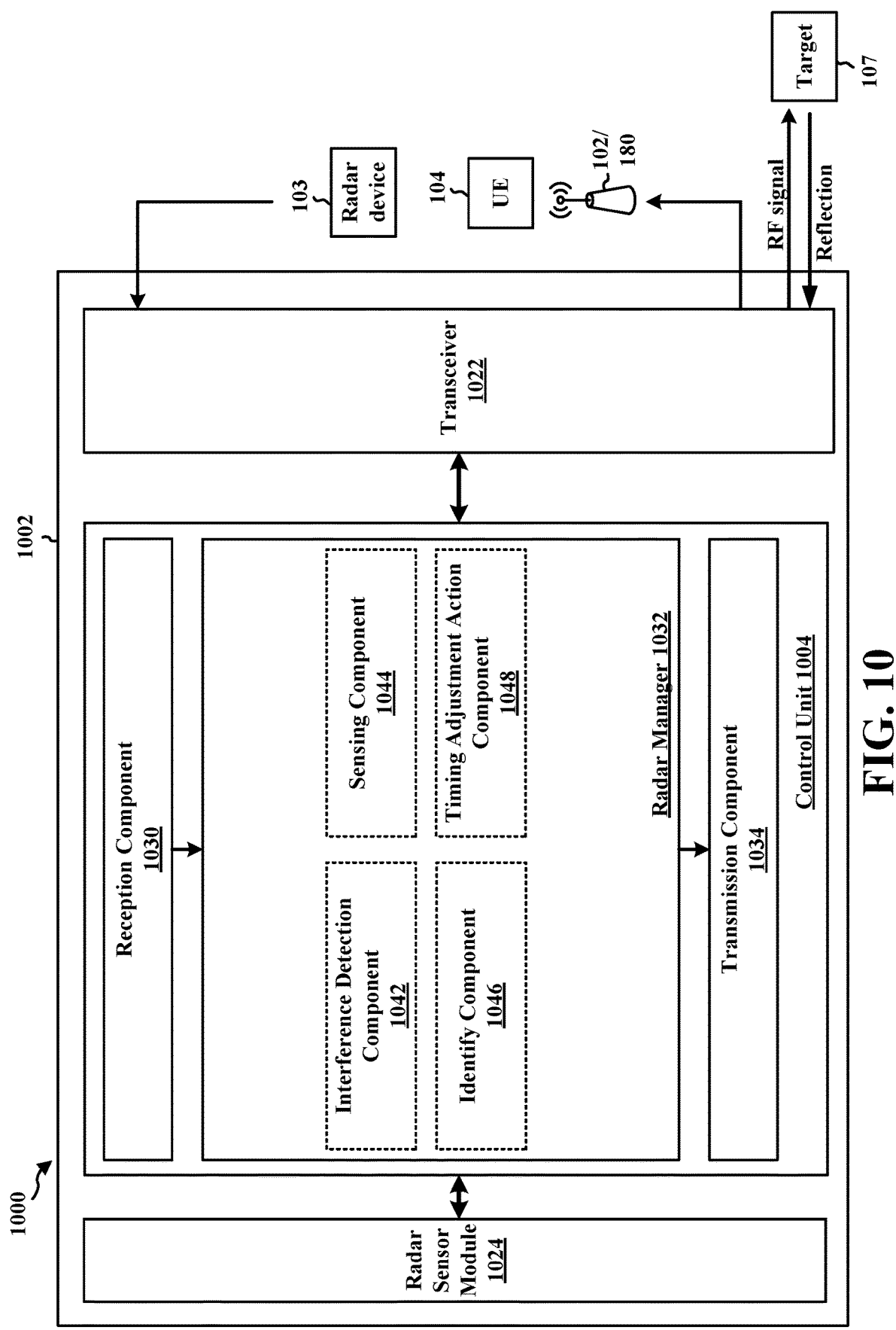
FIG. 10 is a diagram illustrating an example of a hardware implementation for an example apparatus in accordance with various aspects of the present disclosure.

FIG. 10 is a diagram 1000 illustrating an example of a hardware implementation for an apparatus 1002. The apparatus 1002 is a radar device and includes a control unit 1004. The control unit 1004 may communicate through a transceiver 1022, which may include a cellular RF transceiver, with a UE 104 that is in communication with or includes a radar module, a base station 102/180, another radar device 103, etc. The transceiver may also transmit a radar signal and receive a reflection of the radar signal, e.g., in order to detect a target 107, to monitor the environment of the apparatus 1002, etc. In some examples, the cellular RF transceiver and the radar transceiver may comprise separate components. The control unit 1004 may include a computer-readable medium/memory. The control unit 1004 is responsible for general processing, including the execution of software stored on the computer-readable medium/memory. The software, when executed by the control unit 1004, causes the control unit 1004 to perform the various functions described supra. The computer-readable medium/memory may also be used for storing data that is manipulated by the control unit 1004 when executing software. The control unit 1004 further includes a reception component 1030, a radar manager 1032, and a transmission component 1034. The radar manager 1032 includes the one or more illustrated components. The components within the radar manager 1032 may be stored in the computer-readable medium/memory and/or configured as hardware within the control unit 1004. The control unit 1004 may be a component of the wireless device 310 and may include the memory 376 and/or at least one of the TX processor 316, the RX processor 370, and the controller/processor 375. The apparatus may further include a radar sensor module 1024. The radar sensor module 1024 may include additional components, such as a radar sensor component configured to transmit radar signals, a GPS component, or the like.

The radar manager 1032 includes an interference detection component 1042 that detects an interfering radar signal from a second radar device that interferes with measurement of a return of a radar signal from the first radar device, e.g., as described in connection with 802 in FIG. 8. The radar manager 1032 further includes a sensing component 1044 that performs a sensing procedure before transmitting the radar signal, wherein the first radar device detects the interfering radar signal from the second radar device based on the sensing procedure, e.g., as described in connection with 804 in FIG. 8. The radar manager 1032 further includes an identify component 1046 that identifies the second radar device, e.g., as described in connection with 806 in FIG. 8.

The radar manager 1032 further includes a timing adjustment action component 1048 that performs a timing adjustment action in response to detecting the interfering radar signal from the second radar device, e.g., as described in connection with 808 in FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the control unit 1004, includes means for detecting an interfering radar signal from a second radar device that interferes with measurement of a return of a radar signal from the first radar device. The control unit 1004 may further include means for performing a timing adjustment action in response to detecting the interfering radar signal from the second radar device. The control unit 1004 may further include means for adjusting a transmission timing of the radar signal from the first radar device. The control unit 1004 may further include means for transmitting a timing adjustment request to the second radar device. The control unit 1004 may further include means for identifying the second radar device. The control unit 1004 may further include means for performing a sensing procedure before transmitting the radar signal, wherein the first radar device detects the interfering radar signal from the second radar device based on the sensing procedure. The control unit 1004 may further include means for processing, during the sensing procedure, a detected signal from the second radar device to obtain a measurement. The control unit 1004 may further include means for determining that the measurement satisfies a threshold. The control unit 1004 may further include means for identifying a result of the sensing procedure based at least in part on the measurement satisfying the threshold. The aforementioned means may be one or more of the aforementioned components of the apparatus 1002 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, the radar module 362, and the controller/processor 375 configured to perform the functions recited by the aforementioned means.

Figure 11:
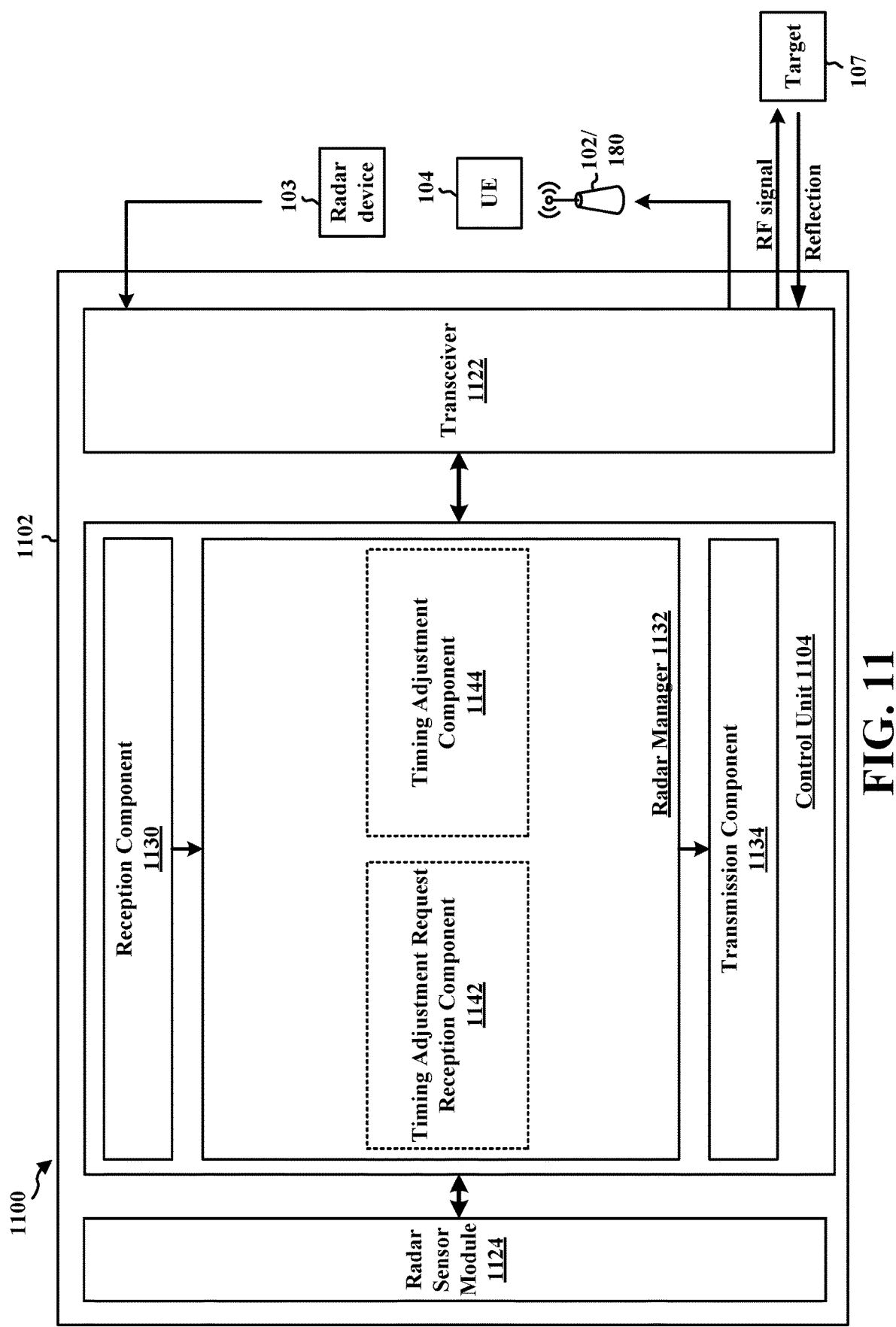
FIG. 11 is a diagram illustrating an example of a hardware implementation for an example apparatus in accordance with various aspects of the present disclosure.

FIG. 11 is a diagram 1100 illustrating an example of a hardware implementation for an apparatus 1102. The apparatus 1102 is a radar device and includes a control unit 1104. The control unit 1104 may communicate through a transceiver 1122, which may include a cellular RF transceiver, that is in communication with a UE 104 that includes a radar module, a base station 102/180, another radar device 103, etc. The transceiver may also transmit a radar signal and receive a reflection of the radar signal, e.g., in order to detect a target 107, to monitor the environment of the apparatus 1002, etc. In some examples, the cellular RF transceiver and the radar transceiver may comprise separate components. The control unit 1104 may include a computer-readable medium/memory. The control unit 1104 is responsible for general processing, including the execution of software stored on the computer-readable medium/memory. The software, when executed by the control unit 1104, causes the control unit 1104 to perform the various functions described supra. The computer-readable medium/memory may also be used for storing data that is manipulated by the control unit 1104 when executing software. The control unit 1104 further includes a reception component 1130, a radar manager 1132, and a transmission component 1134. The radar manager 1132 includes the one or more illustrated components. The components within the radar manager 1132 may be stored in the computer-readable medium/memory and/or configured as hardware within the control unit 1104. The control unit 1104 may be a component of the BS 310 and may include the memory 376 and/or at least one of the TX processor 316, the RX processor 370, and the controller/processor 375. The apparatus may further include a radar sensor module 1124. The radar sensor module 1124 may include additional components, such as a radar sensor component configured to transmit radar signals, a GPS component, or the like.

The radar manager 1132 includes a timing adjustment request reception component 1142 that receives a timing adjustment request from a second radar device, e.g., as described in connection with 902 in FIG. 9. The radar manager 1132 further includes a timing adjustment component 1144 that adjusts a transmission timing of a radar signal in response to the timing adjustment request from the second radar device, e.g., as described in connection with 904 in FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some examples, an apparatus may be capable of performing the aspects of both FIG. 8 and FIG. 9. Thus, the apparatus may include a combination of components 1042, 1044, 1046, 1048, 1142, and 1144.

In one configuration, the apparatus 1102, and in particular the control unit 1104, includes means for receiving a timing adjustment request from a second radar device and means for adjusting a transmission timing of a radar signal in response to the timing adjustment request from the second radar device. The aforementioned means may be one or more of the aforementioned components of the apparatus 1102 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, the radar module 362, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method at a first radar device, comprising: detecting an interfering radar signal from a second radar device that interferes with measurement of a return of a radar signal from the first radar device; and performing a timing adjustment action in response to detecting the interfering radar signal from the second radar device.

Aspect 2 is the method of aspect 1, wherein the timing adjustment action comprises adjusting a transmission timing of the radar signal from the first radar device.

Aspect 3 is the method of aspect 2, wherein the first radar device adjusts the transmission timing of the radar signal comprises on a per-chirp basis.

Aspect 4 is the method of aspect 3, wherein the first radar device adjusts the transmission timing of the radar signal by a random amount of time at each chirp.

Aspect 5 is the method of aspect 2, wherein the first radar device adjusts the transmission timing of the radar signal on a per-frame basis.

Aspect 6 is the method of aspect 3, wherein the first radar device adjusts the transmission timing of the radar signal by a random amount of time at each frame.

Aspect 7 is the method of aspect 1 or 2, wherein the timing adjustment action comprises transmitting a timing adjustment request to the second radar device.

Aspect 8 is the method of aspect 7, wherein the first radar device unicasts the timing adjustment request to the second radar device.

Aspect 9 is the method of aspect 8, further comprising: transmitting the timing adjustment action via a radar communication based on a location of the second radar device through sidelink positioning or a GPS.

Aspect 10 is the method of aspect 7, wherein the first radar device broadcasts the timing adjustment request.

Aspect 11 is the method of aspect 7, wherein the first radar device multicasts the timing adjustment request.

Aspect 12 is the method of any of aspects 1 to 11, further comprising: performing a sensing procedure before transmitting the radar signal, wherein the first radar device detects the interfering radar signal from the second radar device based on the sensing procedure.

Aspect 13 is the method of aspect 12, wherein the sensing procedure comprises an LBT procedure.

Aspect 14 is the method of aspect 12 or 13, wherein detecting the interfering radar signal from the second radar device comprises: processing, during the sensing procedure, a detected signal from the second radar device to obtain a measurement; determining that the measurement satisfies a threshold; and identifying a result of the sensing procedure based at least in part on the measurement satisfying the threshold.

Aspect 15 is the method of aspect 14, wherein if the measurement is less than the threshold, the result of the sensing procedure comprises a successful result and the first radar device transmits the radar signal without the timing adjustment action.

Aspect 16 is the method of aspect 14 or 15, wherein if the measurement is greater than or equal to the threshold, the result of the sensing procedure comprises a failed result that triggers the first radar device to perform the timing adjustment action.

Aspect 17 is the method of any of aspects 14-16, wherein the radar signal comprises a FMCW.

Aspect 18 is the method of any of aspects 14-17, wherein detecting the interfering radar signal comprises detecting that the return of the radar signal is masked by the interfering radar signal from the second radar device.

Aspect 19 is a method at a first radar device, comprising: receiving a timing adjustment request from a second radar device; and adjusting a transmission timing of a radar signal in response to the timing adjustment request from the second radar device.

Aspect 20 is the method of aspect 19, wherein the first radar device adjusts the transmission timing of the radar signal comprises on a per-chirp basis.

Aspect 21 is the method of aspect 20, wherein the first radar device adjusts the transmission timing of the radar signal by a random amount of time at each chirp.

Aspect 22 is the method of aspect 19, wherein the first radar device adjusts the transmission timing of the radar signal on a per-frame basis.

Aspect 23 is the method of aspect 22, wherein the first radar device adjusts the transmission timing of the radar signal by a random amount of time at each frame.

Aspect 24 is the method of any of aspects 19-23, wherein the timing adjustment request is received via unicast.

Aspect 25 is the method of any of aspects 19-23, wherein the timing adjustment request is received via broadcast.

Aspect 26 is the method of any of aspects 19-23, wherein the timing adjustment request is received via multicast.

Aspect 27 is a radar device including at least one processor coupled to a memory and configured to implement a method as in any of aspects 1 to 18.

Aspect 28 is a radar device including at least one processor coupled to a memory and configured to implement a method as in any of aspects 19 to 26.

Aspect 29 is a radar device including means for implementing a method as in any of aspects 1 to 18.

Aspect 30 is a radar device including means for implementing a method as in any of aspects 19 to 26.

Aspect 31 is a non-transitory computer-readable storage medium storing computer executable code, where the code when executed by a processor causes the processor to implement a method as in any of aspects 1 to 18.

Aspect 31 is a non-transitory computer-readable storage medium storing computer executable code, where the code when executed by a processor causes the processor to implement a method as in any of aspects 19 to 26.

What is claimed is:

1. A method performed by a first radar device, comprising:
    detecting an interfering radar signal from a second radar device, by sensing the interfering radar signal as a false target or wideband noise, that potentially interferes with measurement of a return of a radar signal from the first radar device based on a periodic sensing procedure without transmission of the radar signal;
    determining a transmission type between use of a unicast, a multicast, and a broadcast to transmit a timing adjustment request based on whether a location of the second radar device that is a source of the interfering radar signal is identifiable from sidelink positioning or a global positioning system (GPS); and
    transmitting the timing adjustment request comprising an indication to adjust a timing to the second radar device based on detecting the interfering radar signal from the second radar device and using the determined transmission type, wherein the timing adjustment request comprising the indication to adjust the timing is transmitted to the second radar device via the unicast based on the location of the second radar device that is identified through the sidelink positioning or the GPS when the location of the second radar device that is the source of the interfering radar signal is identifiable, and wherein the timing adjustment request comprising the indication to adjust the timing is transmitted to the second radar device via the multicast or the broadcast when the location of the second radar device that is the source of the interfering radar signal is not identifiable.

2. The method of claim 1, wherein the method further comprises adjusting a transmission timing of the radar signal from the first radar device.

3. The method of claim 2, wherein adjusting the transmission timing of the radar signal comprises adjusting the transmission timing of the radar signal based on a per-chirp basis.

4. The method of claim 3, wherein adjusting the transmission timing of the radar signal comprises adjusting the transmission timing of the radar signal by a random amount of time at each chirp.

5. The method of claim 3, wherein adjusting the transmission timing of the radar signal comprises adjusting the transmission timing of the radar signal by a random amount of time at each frame.

6. The method of claim 2, wherein adjusting the transmission timing of the radar signal comprises adjusting the transmission timing of the radar signal on a per-frame basis.

7. The method of claim 1, wherein transmitting the timing adjustment request comprises unicasting the timing adjustment request to the second radar device.

8. The method of claim 1, wherein transmitting the timing adjustment request comprises:
transmitting the timing adjustment request via a radar communication based on the location of the second radar device through the sidelink positioning or the GPS.

9. The method of claim 1, wherein transmitting the timing adjustment request comprises broadcasting the timing adjustment request.

10. The method of claim 1, wherein transmitting the timing adjustment request comprises multicasting the timing adjustment request.

11. The method of claim 1, wherein the periodic sensing procedure comprises a listen before talk (LBT) procedure.

12. The method of claim 1, wherein detecting the interfering radar signal from the second radar device comprises:
processing, during the periodic sensing procedure, a detected signal from the second radar device to obtain the measurement;
determining that the measurement satisfies a threshold; and
identifying a result of the periodic sensing procedure based at least in part on the measurement satisfying the threshold.

13. The method of claim 12, wherein if the measurement is less than the threshold, the result of the periodic sensing procedure comprises a successful result and further comprising transmitting the radar signal without the timing adjustment request.

14. The method of claim 12, wherein if the measurement is greater than or equal to the threshold, the result of the periodic sensing procedure comprises a failed result that triggers transmitting the timing adjustment request.

15. The method of claim 1, wherein the radar signal comprises a frequency modulated continuous wave (FMCW).

16. The method of claim 15, wherein detecting the interfering radar signal comprises detecting that the return of the radar signal is masked by the interfering radar signal from the second radar device.

17. A first radar device, comprising:
memory; and
at least one processor coupled to the memory and configured to:
detect an interfering radar signal from a second radar device, by sensing the interfering radar signal as a false target or wideband noise, that potentially interferes with measurement of a return of a radar signal from the first radar device based on a periodic sensing procedure without transmission of the radar signal;
determine a transmission type between use of a unicast, a multicast, and a broadcast to transmit a timing adjustment request based on whether a location of the second radar device that is a source of the interfering radar signal is identifiable from sidelink positioning or a global positioning system (GPS); and
transmit the timing adjustment request comprising an indication to adjust a timing to the second radar device based on detection of the interfering radar signal from the second radar device and with the determined transmission type, wherein the timing adjustment request comprising the indication to adjust the timing is transmitted to the second radar device via the unicast based on the location of the second radar device that is identified through the sidelink positioning or the GPS if the location of the second radar device that is the source of the interfering radar signal is identifiable, and wherein the timing adjustment request comprising the indication to adjust the timing is transmitted to the second radar device via the multicast or the broadcast if the location of the second radar device that is the source of the interfering radar signal is not identifiable.

18. The first radar device of claim 17, wherein the at least one processor coupled to the memory is further configured to: adjust a transmission timing of the radar signal from the first radar device.

19. The first radar device of claim 18, wherein to adjust the transmission timing, the at least one processor coupled to the memory is configured to adjust the transmission timing of the radar signal comprises on a per-chirp basis.

20. The first radar device of claim 19, wherein to adjust the transmission timing, the at least one processor coupled to the memory is configured to adjust the transmission timing of the radar signal by a random amount of time at each chirp.

21. The first radar device of claim 19, wherein to adjust the transmission timing, the at least one processor coupled to the memory is configured to adjust the transmission timing of the radar signal by a random amount of time at each frame.

22. The first radar device of claim 18, wherein to adjust the transmission timing, the at least one processor coupled to the memory is configured to adjust the transmission timing of the radar signal on a per-frame basis.

23. The first radar device of claim 17, wherein to transmit the timing adjustment request, the at least one processor coupled to the memory is configured to unicast the timing adjustment request to the second radar device.

24. The first radar device of claim 23, wherein to transmit the timing adjustment request, the at least one processor coupled to the memory is configured to:
transmit the timing adjustment request via a radar communication based on the location of the second radar device through the sidelink positioning or the GPS.

25. The first radar device of claim 17, wherein to transmit the timing adjustment request, the at least one processor coupled to the memory is configured to broadcast the timing adjustment request.

26. A first radar device, comprising:
means for detecting an interfering radar signal from a second radar device, by sensing the interfering radar signal as a false target or wideband noise, that potentially interferes with measurement of a return of a radar signal from the first radar device based on a periodic sensing procedure without transmission of the radar signal;
means for determining a transmission type between use of a unicast, a multicast, and a broadcast to transmit a timing adjustment request based on whether a location of the second radar device that is a source of the interfering radar signal is identifiable from sidelink positioning or a global positioning system (GPS); and means for transmitting the timing adjustment request comprising an indication to adjust a timing to the second radar device based on detecting the interfering radar signal from the second radar device and using the determined transmission type, wherein the timing adjustment request comprising the indication to adjust the timing is transmitted to the second radar device via the unicast based on the location of the second radar device that is identified through the sidelink positioning or the GPS if the location of the second radar device that is the source of the interfering radar signal is identifiable, and wherein the timing adjustment request comprising the indication to adjust the timing is transmitted to the second radar device via the multicast or the broadcast if the location of the second radar device that is the source of the interfering radar signal is not identifiable in response to detecting the interfering radar signal from the second radar device.

27. A non-transitory computer-readable medium storing computer executable code at a first radar device, the code when executed by a processor causes the processor to:

detect an interfering radar signal from a second radar device, by sensing the interfering radar signal as a false target or wideband noise, that potentially interferes with measurement of a return of a radar signal from the first radar device based on a periodic sensing procedure without transmission of the radar signal;

determine a transmission type between use of a unicast, a multicast, and a broadcast to transmit a timing adjustment request based on whether a location of the second radar device that is a source of the interfering radar signal is identifiable from sidelink positioning or a global positioning system (GPS); and transmit the timing adjustment request comprising an indication to adjust a timing to the second radar device based on detection of the interfering radar signal from the second radar device and using the determined transmission type, wherein the timing adjustment request comprising the indication to adjust the timing is transmitted to the second radar device via the unicast based on the location of the second radar device that is identified through the sidelink positioning or the GPS if the location of the second radar device that is the source of the interfering radar signal is identifiable, and wherein the timing adjustment request comprising the indication to adjust the timing is transmitted to the second radar device via the multicast or the broadcast if the location of the second radar device that is the source of the interfering radar signal is not identifiable.

* * * * *